(12) United States Patent
Wolz et al.

(10) Patent No.: US 8,663,368 B2
(45) Date of Patent: *Mar. 4, 2014

(54) PROCESS AND APPARATUS FOR REMOVING METHANE OR ANOTHER FLUID FROM A FLUID MIXTURE

(71) Applicants: Bret Hettinger Wolz, Gillette, WY (US); John Mayer Kaufman, Centennial, CO (US)

(72) Inventors: Bret Hettinger Wolz, Gillette, WY (US); John Mayer Kaufman, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,821

(22) Filed: Jan. 10, 2013

(65) Prior Publication Data

US 2013/0192466 A1 Aug. 1, 2013

(51) Int. Cl.
*B01D 19/00* (2006.01)

(52) U.S. Cl.
USPC .......... 95/248; 95/249; 95/260; 96/194; 96/204; 96/205; 96/215; 210/747.7; 210/170.07

(58) Field of Classification Search
USPC ........ 95/248, 249, 260, 261, 262, 31; 96/194, 96/204, 205, 215, 183, 184, 185, 186; 210/747.7, 170.07
See application file for complete search history.

(56) References Cited

U.S. PATENT DOCUMENTS

| | | | |
|---|---|---|---|
| 2,527,444 A | 10/1950 | Pape | |
| 3,457,703 A | 7/1969 | Cheysson | |
| 4,589,984 A | 5/1986 | Legrand et al. | |
| 5,352,276 A | 10/1994 | Rentschler et al. | |
| 5,679,265 A | 10/1997 | Van Schie | |
| 8,096,934 B2 | 1/2012 | Koide et al. | |
| 8,366,808 B2 | 2/2013 | Wolz et al. | |
| 2002/0017193 A1* | 2/2002 | Ramos | 95/260 |
| 2002/0170858 A1 | 11/2002 | Maddux et al. | |
| 2005/0005772 A1 | 1/2005 | Spani | |

OTHER PUBLICATIONS

Amtrol, Inc. Product Brochure (2007) Tangential Air Separators ASME—for Closed Hydronic Heating & Chilled Water Systems, 4 pages.
TACO, Inc. Submittal Data Information Sheet (2006) VorTech & 4900 Series Air Separators, 1 page.
Turner (2003) "Separating Water & Gas" Fluent Inc. publication, 1 page.
Liqui-Cel Membrane Contractors Product Brochure (2008), 4 pages.
Stanley Filter Company Product Brochure (undated), The Stanley Downhole Gas Separator, 2 pages.
PCT International Search Report and Written Opinion in Application PCT/US2011/039087, mailed Feb. 24, 2012, 11 pgs.
U.S. Appl. No. 12/815,292, Office Action mailed Mar. 14, 2012, 10 pgs.

(Continued)

*Primary Examiner* — Duane Smith
*Assistant Examiner* — Douglas Theisen
(74) *Attorney, Agent, or Firm* — Merchant & Gould, P.C.

(57) ABSTRACT

A method and apparatus for separating a first fluid from a fluid mixture. In one embodiment water containing methane is passed through an agitation chamber with a plate at the chamber's proximal and distal ends. Both plates have orifices permitting the mixed fluid to pass into and out of the agitation chamber. In one embodiment, the mixed fluid rotates about its axis of flow through the agitation chamber. In one embodiment, the mixed fluid passes through a separation chamber having a plurality of baffles that promote separation of the methane from the methane/water mixture. In one embodiment, the separated methane is removed from the water in a collection chamber that facilitates gravity separation of the mixed fluids.

20 Claims, 10 Drawing Sheets

(56) References Cited

OTHER PUBLICATIONS

U.S. Appl. No. 12/815,292, Amendment and Response filed Aug. 14, 2012, 13 pgs.

U.S. Appl. No. 12/815,292, Notice of Allowance mailed Oct. 2, 2012, 7 pgs.

* cited by examiner

PROCESS AND APPARATUS FOR REMOVING METHANE OR ANOTHER FLUID FROM A FLUID MIXTURE

The present application is a continuation of, and claims priority to, U.S. Pat. No. 8,366,808 filed on Jun. 14, 2010. The aforementioned patent and is hereby incorporated by reference in its entirety.

BACKGROUND OF THE INVENTION

A fluid may comprise a mixture of fluids with different properties. For example, some fluids are liquids containing entrained gas, other fluids may combine liquids having different physical properties such as oil and water mixtures. Water removed from coal seams often contains entrained methane and other gases. Methane may partially separate from coal seam water during pumping. However, this partial separation may be inefficient in that entrained methane often remains in the water pumped from the seam. The entrained methane is a valuable commodity in and of itself. As is well known, methane is an efficient and environmentally friendly fuel, producing water and carbon dioxide when burned.

Methane left in water can create numerous problems. Water-laden methane requires additional chlorine demand in water disinfection systems. The increased use of chlorine in water treatment increases EPA-regulated by-products. Additionally, the colorless and odorless methane can be an explosion and fire hazard in water supplies. Pumping methane water can also be difficult because the methane can create gas locks.

Entrained methane can be removed from water by letting the water rest for an extended period of time. Such is often accomplished in an enclosed tank, with valves and/or piping that vent the methane evolved to the atmosphere or by placing the water in an open pond, as occurs in the coal bed methane fields in the Powder River Basin of Wyoming. At times the removal is enhanced by air sparging (adding air to the water) or by adding chemicals to the methane/water mixture. Because methane is odorless and colorless, it escapes unnoticed into the atmosphere.

Methane is known as a particularly damaging greenhouse gas. Methane takes years to breakdown naturally in the atmosphere. When it decomposes, it creates carbon dioxide, a greenhouse gas. Methane is over 20 times more effective at trapping heat in the atmosphere than carbon dioxide.

The amount of methane escaping into the atmosphere is significant. It is believed Powder River Basin coal bed methane wells are between 75% and 98% efficient in separating methane gas from pumped coal bed water. If existing Powder River Basin coal bed methane wells average 85% efficiency, 675,000 mcf of methane escapes into the atmosphere from just Powder River Basin wells each day.

Coal bed water is not the only fluid containing potentially harmful fluids. Entrained gases and volatile compounds may be found in polluted groundwater. For example, radon is a harmful gas that may be found in ground water. Additionally, hydrocarbon gases other than methane may also be found in ground water. It is undesirable to vent the entrained gases or compounds in polluted groundwater to the atmosphere because they may be toxic and may also contribute to greenhouse gas pollution.

Additionally, it may be desirable to separate mixtures of fluids having different physical properties. For example, crude oil spilled or released into water can cause significant environmental damage. The oil/water mixture may also contain gases. Also, motor oil, or other liquids, may be spilled or released into groundwater. Methods exist for removing such fluids from water but the known methods require significant energy input, are relatively inefficient and slow and may introduce harmful greenhouse gases into the atmosphere.

Currently used methods and apparatus for removing unwanted fluids from fluid mixtures are slow and relatively inefficient and often release unwanted greenhouse gases. Heretofore, efficient and cost effective methods and apparatus for removing unwanted fluids from fluid mixtures were not available. Although specific problems are described in this background section, the invention is not limited to solving these particular problems. Embodiments of the present invention may be useful in solving other problems not specifically described in this section. Thus, the background section should not be used to limit the scope of the appended claims.

SUMMARY OF THE INVENTION

One embodiment of the invention provides a system and apparatus that efficiently and cost effectively removes a fluid from a fluid mixture, such as methane from water containing methane, radon from ground water or liquid hydrocarbons from water.

In one embodiment, a fluid mixture having a first fluid component and a second fluid component is introduced into a process stream. The local velocity of the fluid mixture is changed by passing the mixture through a plurality of restrictions. The change in local velocity causes at least a portion of the first fluid component to separate from the fluid mixture. At least a portion of the first fluid component separated from the fluid mixture is discharged along with at least a portion of the second fluid component. In certain embodiments, the first fluid component is collected. In other embodiments, the first fluid component is collected under negative pressure. In some embodiments, the temperature of the fluid mixture is changed such as, for example, by more than five degrees Fahrenheit. In other embodiments, baffles are used to change the rate of flow of the fluid mixture. The baffles may be generally horizontal, and in some embodiments, conical.

In one embodiment, the fluid mixture is passed through a chamber after causing the mixture to repeatedly change velocity. In one aspect of the invention, the fluid mixture enters the chamber through a first plurality of apertures. In another embodiment, the fluid mixture exits the chamber through a second plurality of apertures. In yet another embodiment, the fluid mixture is caused to rotate around the mixture's general axis of flow through the chamber by impinging upon a surface angled relative to the mixture's general axis of flow. In one embodiment, the fluid mixture is caused to rotate around the mixture's axis of flow through the chamber by introducing the mixture into the chamber through nozzles angled relative to the fluid mixture's general axis of flow.

In one embodiment, the process is used to process a mixture of water and methane.

In another embodiment, the restrictions through which the fluid passes are a plurality of apertures within a conduit, the apertures having a cross-sectional area smaller than the average cross-sectional area of said conduit. The fluid mixture is then passed through a chamber containing a baffle, the baffle facilitating the aggregation of gas bubbles in the fluid mixture.

In one embodiment, the mixed fluid includes a first fluid component and a second fluid component. The mixed fluid is cause to experience turbulent flow within a conduit. The turbulent flow causes a portion of the first and second fluid components to separate. The mixed fluid is caused to experience laminar flow within the conduit. The laminar flow facilitates further separation of the first and second fluid components. At least a portion of the separated first fluid component is removed from the conduit. At least a portion of the second separated fluid component is also removed from the conduit. In another embodiment, the turbulent flow is caused by passing the mixed fluid through a restriction. In yet another embodiment, the mixed fluid experiences centrifugal force. In one embodiment, the first fluid component is methane and said second fluid component is water.

Another embodiment of the invention comprises a fluid separation system. The system has a first chamber causing a mixed fluid comprising a first fluid component and a second fluid component to experience turbulent flow when passed through the first chamber. A second chamber causes the mixed fluid to experience laminar flow when passed through the second chamber. The turbulent flow and laminar flow causes a portion of the first fluid component to aggregate. A first fluid component removal orifice is in fluid communication with the aggregated first fluid component. A second fluid component removal orifice is in fluid communication with the second fluid component. In one embodiment, the second chamber contains a plurality of baffles. In another embodiment, the baffles are conical.

In yet another embodiment, a third chamber facilitates gravity separation of the first fluid component from the second fluid component. The third chamber has the first fluid component removal orifice positioned in fluid communication with the gravity separated first fluid component. The third chamber also has the second fluid component removal orifice positioned in fluid communication with the gravity separated second fluid component. In some embodiments, the mixed fluid contains a third fluid component. The third chamber facilitates gravity separation of the third fluid component from the first fluid component and the second fluid component. The third chamber has a third fluid component removal orifice positioned in fluid communication with the gravity separated third fluid component.

DETAILED DESCRIPTION OF THE INVENTION

This disclosure is intended to describe the novel features of the claimed invention. Those of ordinary skill in the art will recognize alternate equivalent methods and devices for removing fluids from fluid mixtures upon reading this disclosure.

Figure 1:
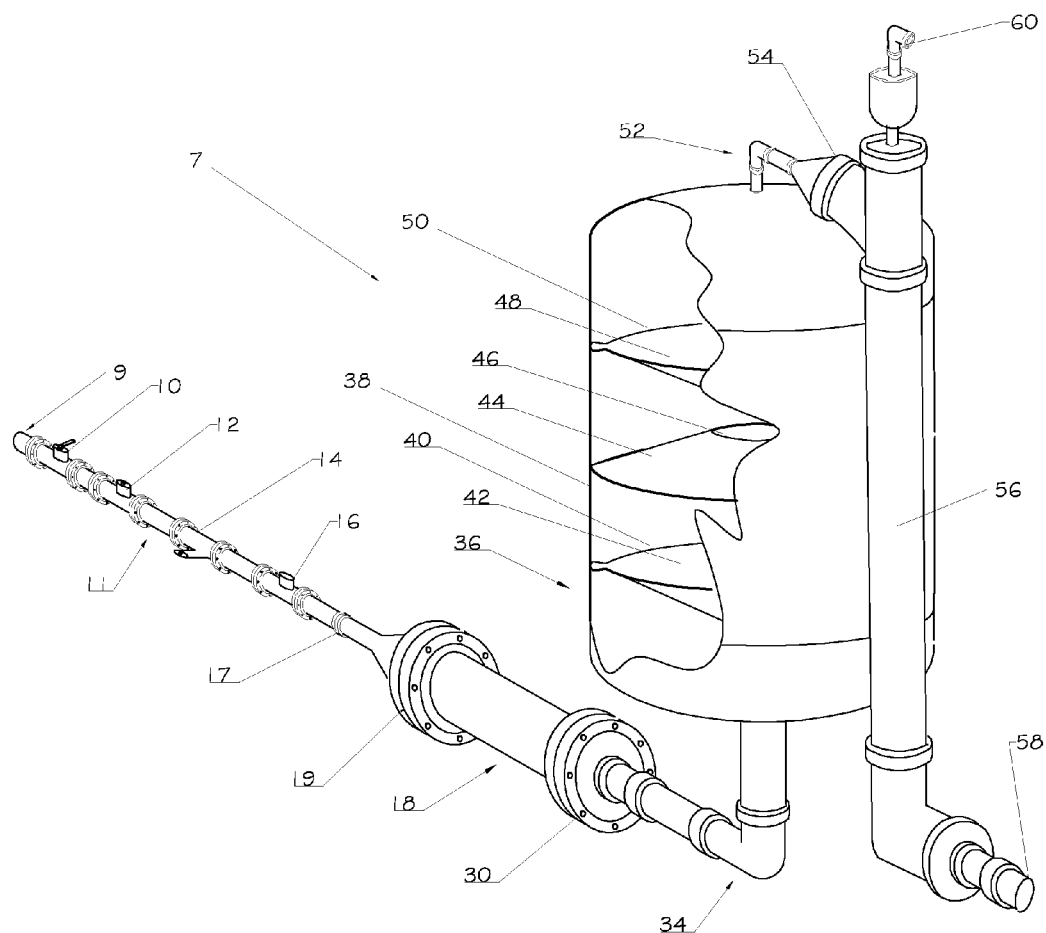
FIG. 1 is a partial cut away perspective view of one embodiment of a fluid separation system.

FIG. 1 depicts a cut away perspective view of an embodiment of the fluid separation system 7 that is adapted for removal of a fluid from a fluid mixture, such as methane from water. The methane-laden water may be water pumped from a coal seam or from an aquifer.

While it is currently contemplated that the invention will be used with groundwater, i.e., water found below the earth's surface, the inventions general application is not so limited. For example, it is contemplated that the invention can be used to separate liquid hydrocarbons from water at the earth's surface, such as water contaminated with crude oil or petroleum derived products. Also, the invention is not limited to the separation of hydrocarbons from water as it can be used to separate radon from water as well. Additionally, as presently contemplated, the invention is not limited to separation of fluids from water. For example, it is contemplated that the invention can be used to separate gaseous hydrocarbons from liquid hydrocarbons.

After being removed from a coal seam or aquifer and being pumped to the earth's surface, water containing methane is introduced into the system at inlet 9. An inlet valve 10 is placed in the flow path and may be used to control the rate of flow of the fluid mixture into conduit 11. Inlet valve 10 is a typical ball valve as will be known to one of ordinary skill. A check valve 12 prevents back-flow. A strainer 14, such as manufactured by Mueller Manufacturing, having approximately 20 openings per square inch, removes solid particulates that may be in the fluid. A flow meter 16 monitors the rate of fluid flow and can provide data used, in conjunction with inlet valve 10, to control the rate of fluid flow through the fluid separation system 7. With the embodiment described, the desired rate of flow is typically between approximately 7 and 10 gpm. The fluid mixture passes through screen 17 having approximately 10-20 openings per square inch.

As the fluid mixture passes through strainer 14 and screen 17, the velocity of the fluid changes. Herein, velocity includes direction of flow and speed (the time rate of change of the position of discrete fluid components without regard to direction). The fluid's speed increases as it passes through strainer 14 and screen 17 because the cross-sectional area of the flow path is decreased and the speed of the fluid passing through the decreased area must increase to maintain the overall rate of fluid flow through the fluid separation system 7. The velocity of the fluid also changes because the fluid must change direction to pass through the openings in strainer 14 and screen 17.

After flowing through screen 17, the fluid is introduced into an agitation chamber 18 that has a diameter approximately four to 9 times larger than the conduit 11 and is 2-3 times its diameter in length. Specifically, in the embodiment described, the conduit 11 has an inside diameter of approximately one inch and the agitation chamber 18 has an inside diameter of approximately eight inches.

Figure 2:
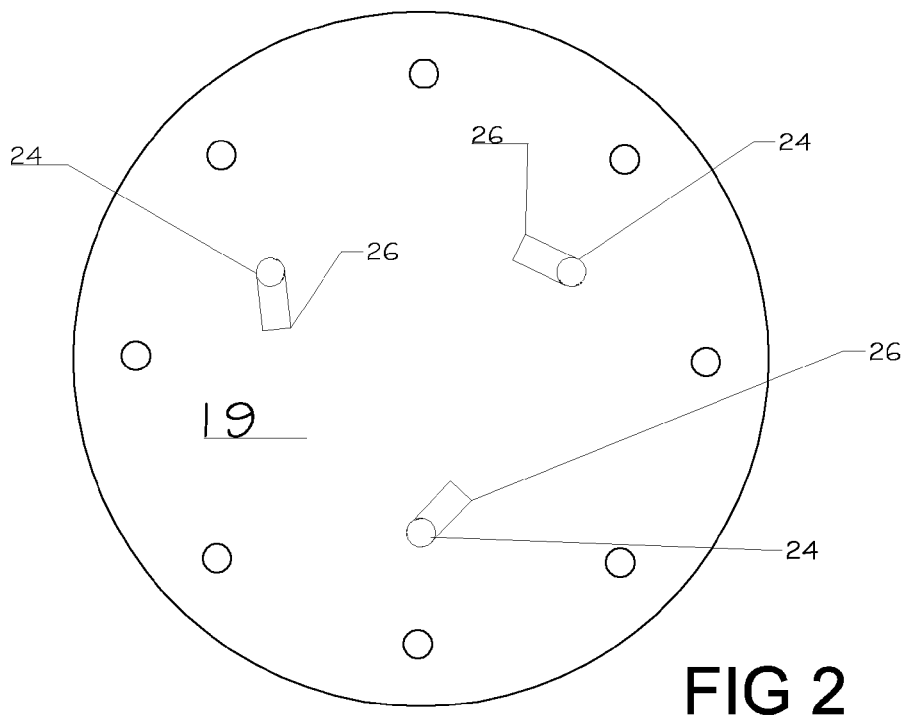
FIG. 2 is a front view of one embodiment of an agitation chamber inlet plate.

At the proximal end of the agitation chamber 18 is an agitation chamber inlet plate 19. In one embodiment, as shown in FIG. 2, agitation chamber inlet plate 19 has three inlet orifices 24 formed in nozzles 26 that are angled relative to the longitudinal axis of agitation chamber 18. In the embodiment depicted, the inlet orifices 24 have an inside diameter of approximately ⅜ inch.

In the embodiment depicted in FIG. 2, the fluid exits the inlet orifices 24 at an angle relative to the longitudinal axis of agitation chamber 18 and impinges on the inner wall of the agitation chamber 18. It is presently contemplated that nozzles 26 would be angled such that the resulting fluid flow tends to rotate around the longitudinal axis of the agitation chamber 18 as it progresses through the agitation chamber 18. All of the nozzles can be angled approximately 30 degrees from the Z axis of FIG. 2 and, as depicted, approximately 60 degrees down from the X axis for the upper right nozzle, approximately 60 degrees left of the Y axis of FIG. 2 for the lower nozzle and approximately parallel with the Y axis of FIG. 2 for the left nozzle.

In this embodiment, the velocity of the fluid changes because the direction of fluid flow changes from being generally parallel to the longitudinal axis of the agitation chamber 18 prior to entering nozzles 26 to being angled relative to the same axis. Also, the fluid's speed changes from a lower rate prior to entering the nozzles 26 to a higher rate as it accelerates and passes through the nozzles 26. As the fluid exits the inlet orifices 24, its speed decreases and, as the fluid impinges on the agitation chamber 18 inner wall, the direction of flow becomes rotational and velocity constantly changes with the rotational flow. Thus, both aspects of velocity, e.g., speed and direction of flow, are changed as the fluid enters the agitation chamber 18. Additionally, the rotational flow imparts a centrifugal force on the fluid.

Figure 3:
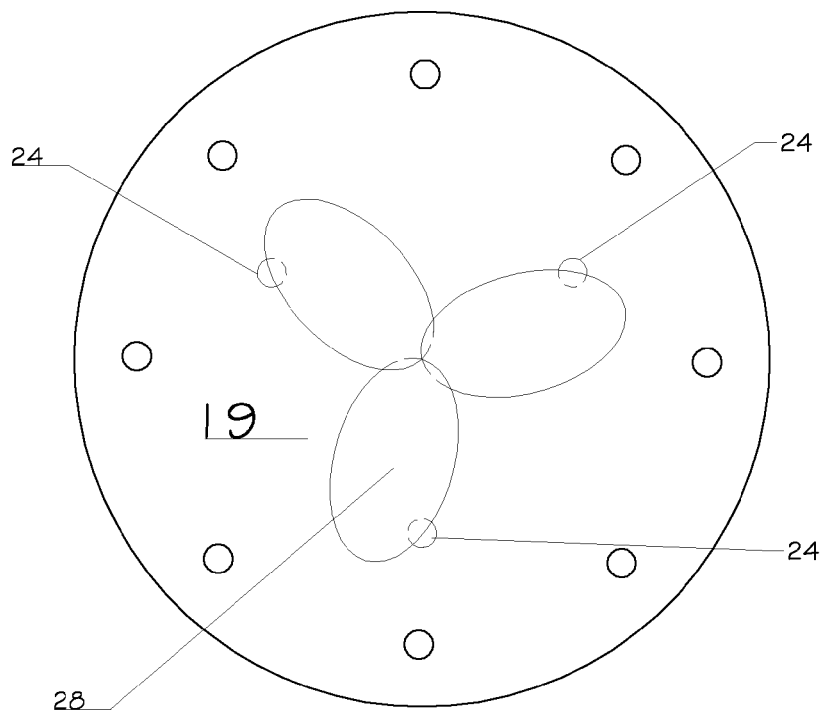
FIG. 3 is a front view of a second embodiment of an agitation chamber inlet plate.

FIG. 3 depicts an alternate embodiment of the agitation chamber inlet plate 19. In this embodiment, the agitation chamber inlet plate 19 has three inlet orifices 24. The inlet orifices 24 have an inside diameter of approximately ⅜ inch. The inlet orifices 24 are formed into the agitation chamber inlet plate 19 and paths through the inlet plate 19 are generally parallel to the longitudinal axis of the agitation chamber 18. An impeller 28 is adjacent the inlet orifices 24. The impeller 28 has a diameter of approximately 7½ inches. As the fluid enters the agitation chamber 18 through inlet orifices 24, it impinges on impeller 28 and causes impeller 28 to rotate. Impact with impeller 28 causes the fluid to deflect at an angle relative to the longitudinal axis of the agitation chamber 18.

Many alternative structures could be used to change the velocity of the fluid in the agitation chamber 18. For example, impeller 28 could be replaced with fixed vanes. Also, rather than imparting a rotational flow, the velocity of the fluid could be changed by repeatedly forcing the fluid in one linear direction and then another.

Figure 4:
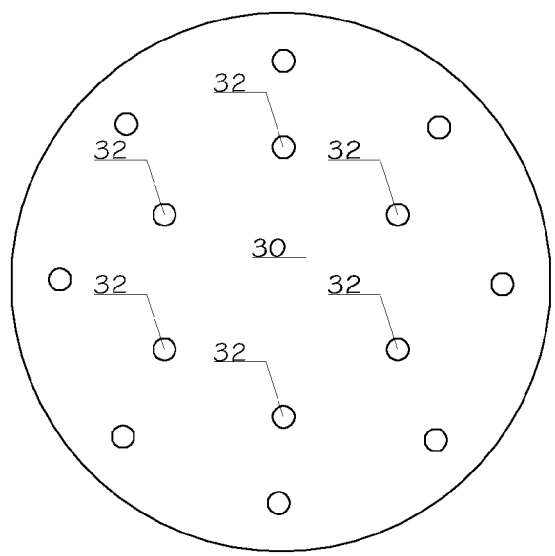
FIG. 4 is a front view of one embodiment of an agitation chamber outlet plate.

FIG. 4 depicts the agitation chamber outlet plate 30 that is located at the distal end of the agitation chamber 18. In this embodiment, the agitation chamber outlet plate 30 has six outlet plate orifices 32. The outlet plate orifices 32 change the velocity of the fluid. The outlet plate orifices have a diameter of approximately ½ inch. The outlet plate orifices 32 are formed in the outlet plate 30 and the fluid flow path through the outlet plate 30 is generally parallel to the longitudinal axis of the agitation chamber 18. In this embodiment, the agitation chamber outlet plate 30 is approximately 18 inches from the agitation chamber inlet plate 19. FIG. 4 merely shows one embodiment of an outlet plate 30. In other embodiments, outlet plate 30 may be designed with different orifices or other features.

After the fluid passes through the outlet plate 30, it passes through a reducer to separation chamber inlet piping 34 and enters the bottom of the separation chamber 36. The inlet piping 34 has an inside diameter of approximately 4 inches.

The separation chamber 36 provides conditions conductive to the collection or aggregation of the fluid to be collected. The separation chamber 36 changes the velocity of the fluid mixture. In general, the speed of the fluid mixture is greatly reduced as it passes through the separation chamber 36 and the flow is relatively calm because the restrictions on the fluids flow are reduced. When methane is processed, the separation chamber 36 encourages bubbles of methane to join and form larger bubbles. When the fluid to be collected is a liquid, the separation chamber 36 encourages droplets of the liquid to be collected to join and form larger droplets.

Figure 5:
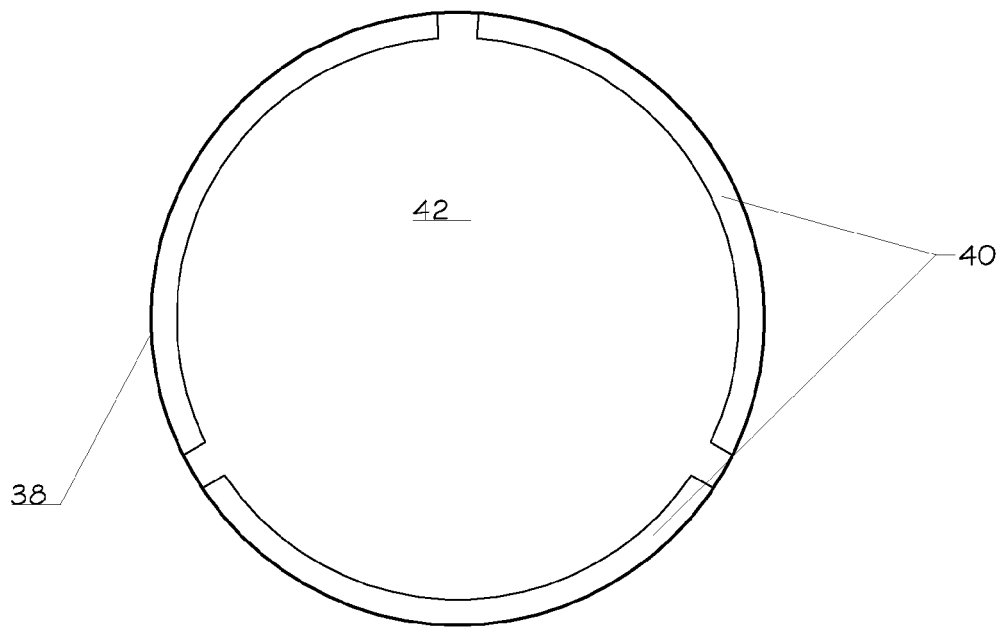
FIG. 5 is a top view of one embodiment of a first baffle.

In the embodiment shown in FIG. 1, the separation chamber 36 is generally cylindrical and has a diameter of approximately 24 inches that is defined by sidewall 38. The separation chamber 36 is approximately 36 inches tall. The fluid entering the separation chamber 36 next passes through arcuate slots 40 defined between the separation chamber sidewall 38 and a first baffle 42, as shown in FIG. 5. The first baffle 42 is conical in shape. In one embodiment, the arcuate slots 40 are approximately 23 and ⅔ inches long adjacent the separation chamber sidewall 38 and are approximately one inch wide. The apex of the first baffle 42 is approximately ⅛th the separation chamber 36 diameter below the arcuate slots 40.

Figure 6:
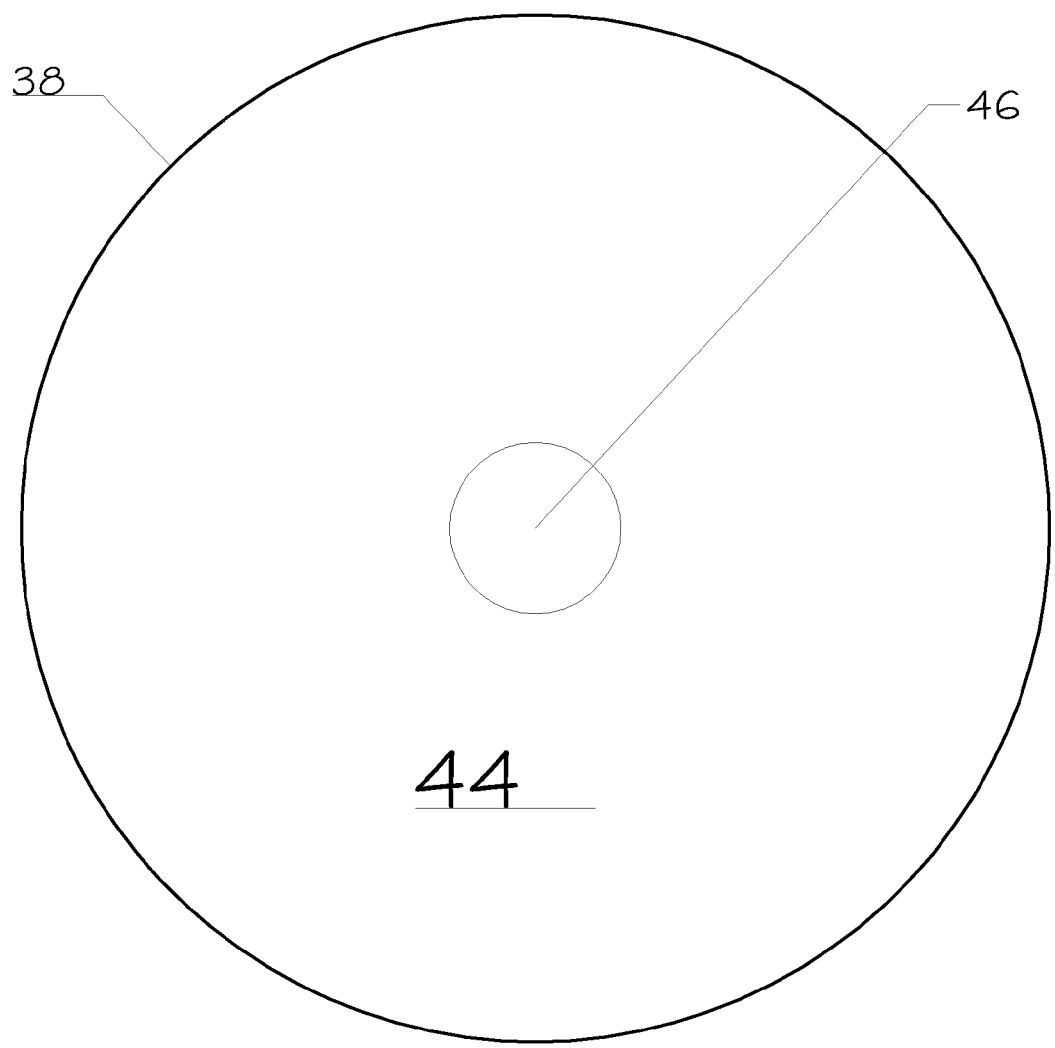
FIG. 6 is a top view of one embodiment of a second baffle.

The separation chamber 36 has a second baffle 44 above the first baffle 42 that is also conical in shape and has aperture 46 in place of the apex of the cone. The base of second baffle 44 is connected to sidewall 38. The apex of the second baffle 44 is approximately ⅛th the separation chamber 36 diameter above the base of the second baffle 44. The aperture 46, as shown in FIG. 6, in the second baffle 44 has a diameter of 4 inches.

A third baffle 48 is above the second baffle 44. The third baffle 48 defines arcuate slots 50 between the separation chamber sidewall 38 and the third baffle 48 periphery. The third baffle 48 is identical to the first baffle 42 and has its apex below slots 50. The base of third baffle 48 is approximately ⅛th of the diameter of the separation chamber 36 above the apex of the third baffle 48.

The second baffle 44 apex is approximately midway between the top and bottom of the separation chamber 36. The base of the first baffle 42 is approximately midway between the apex of the second baffle 44 and the bottom of the separation chamber 36. The base of the third baffle 48 is approximately midway between the apex of the second baffle 44 and the top of the separation chamber 36.

Figure 7:
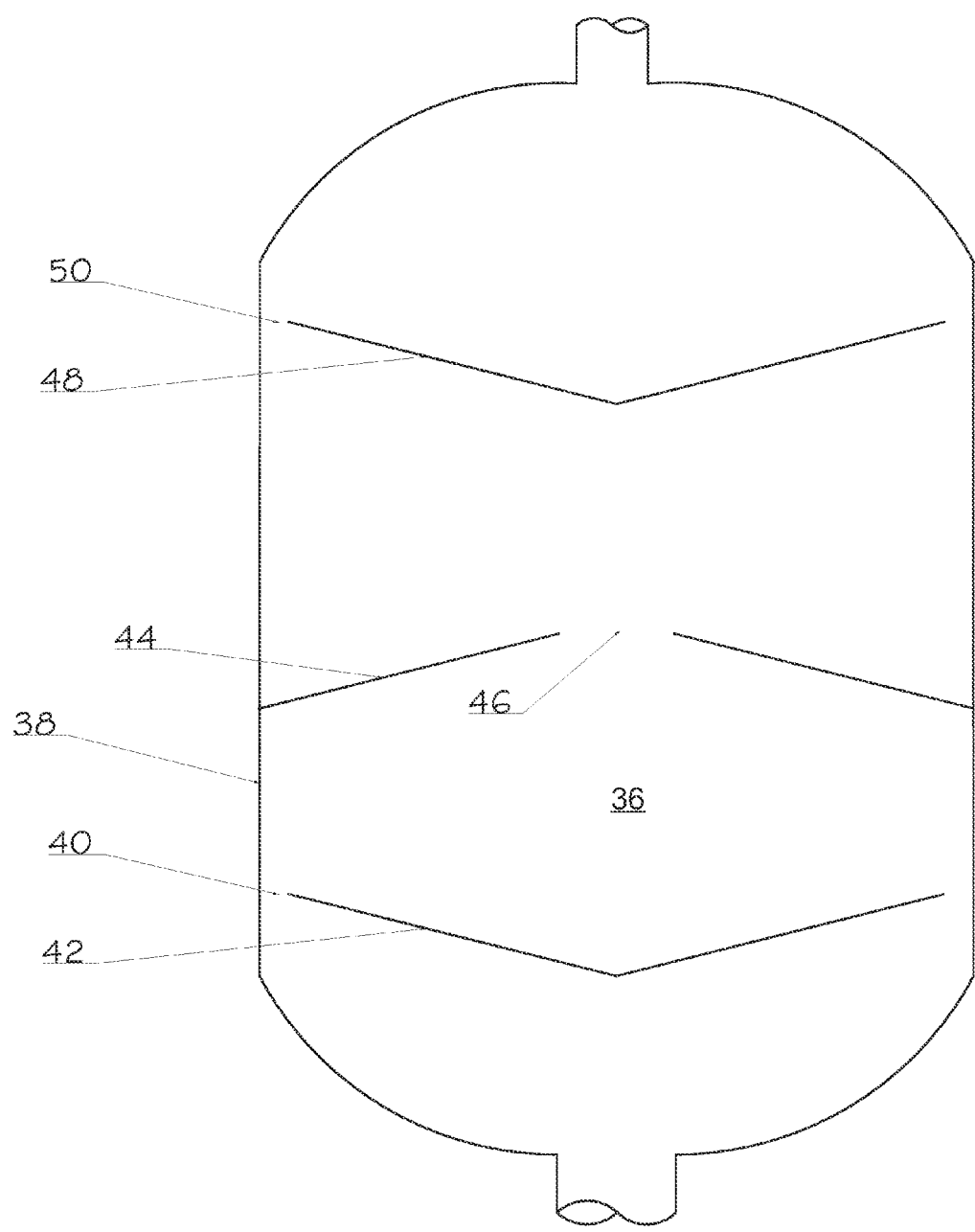
FIG. 7 is a cut away side view of one embodiment of a separation chamber.

FIG. 7 is a cross-sectional view of the separation chamber 36. As depicted in FIG. 7, the first conical baffle 42 has arcuate slots 40 between the first baffle 42 and the separation chamber sidewall 38. The second conical baffle 44 has an aperture 46 at its apex and is connected to the sidewall 38 at its base. The third baffle 48 is depicted with its apex below arcuate slots 50.

The fluid exits the separation chamber 36 through collection chamber inlet piping 52 that has an inside diameter of one inch. The collection chamber inlet piping 52 connects to an inlet piping expander 54 that increases the diameter of the fluid flow path to approximately four inches. The fluid passes through inlet piping and inlet piping expander 54 to collection chamber 56. Collection chamber 56 has a diameter of approximately four inches and is approximately 48 long.

Because methane separated by the process from the coal seam water is lighter than water, it tends to rise in the collection chamber 56 while the water falls in the collection chamber 56. In one embodiment, a sight tube is connected to the collection chamber 56 so the surface elevation of the water can be monitored. It is generally desired that the water fill the bottom ⅔ to ¾ of the collection chamber 56. One of ordinary skill in the art would recognize that known sensors could replace the sight tube and could be configured to automatically regulate inlet fluid flow to maintain the proper water level in collection chamber 56.

Water is discharged from discharge outlet 58 at the bottom of collection chamber 56. The discharge outlet 58 has a diameter of approximately two inches.

Methane is collected through collection outlet 60. Collection outlet 60 has a diameter of approximately one inch. In some applications, it may be desirable to create a partial vacuum at collection outlet 60. The collected methane may be used as a fuel source, as is commonly understood.

The fluid separation system 7 is sealed when used to collect methane, or other gases. In other words, the fluid mixture is not exposed to the atmosphere as it passes through the fluid separation system 7 and separated gases cannot leave the fluid separation system 7 except through the collection outlet 60. If small amounts of gas remain in the fluid mixture at the end of the process, this unseparated gas can only leave the fluid separation system with the processed fluid mixture through discharge outlet 58.

Figure 8:
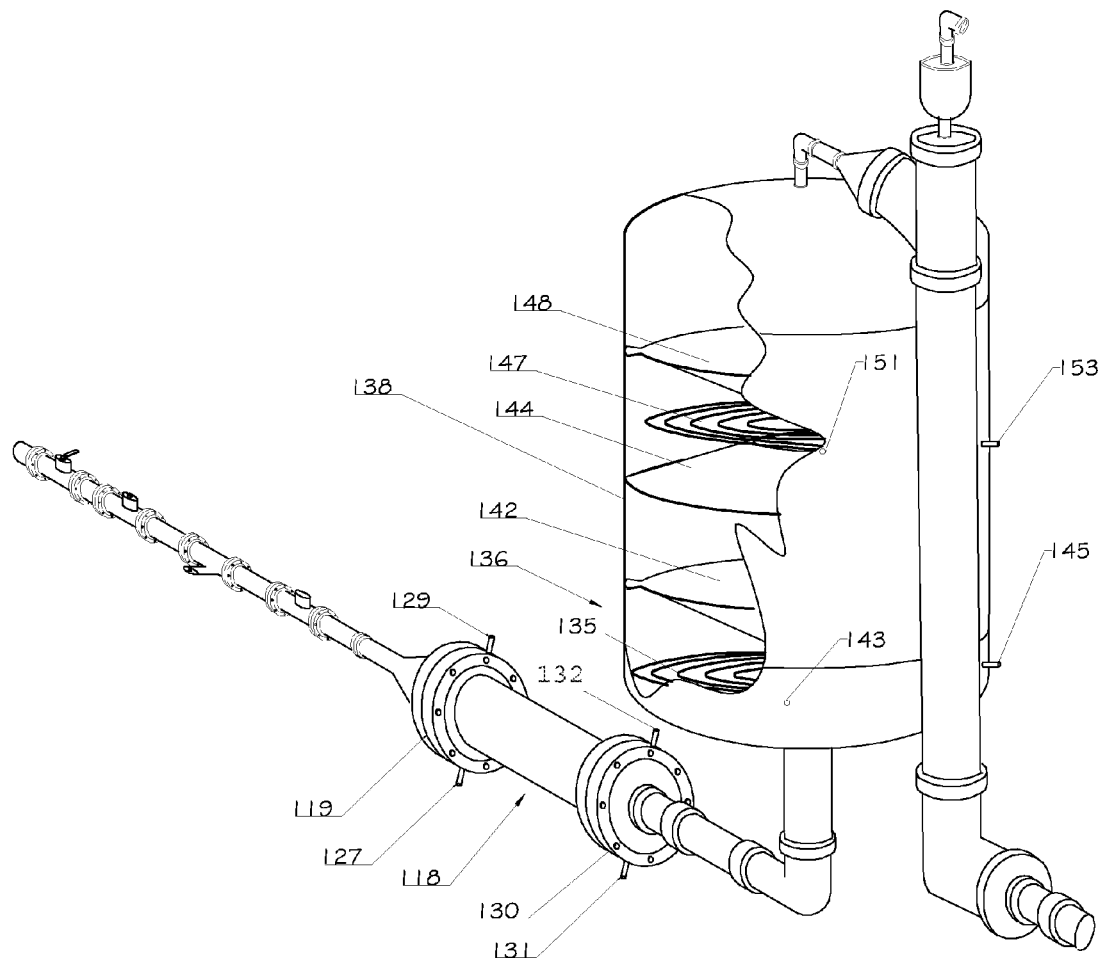
FIG. 8 is a partial cut away perspective view of one embodiment of a fluid separation system.
Figure 9:
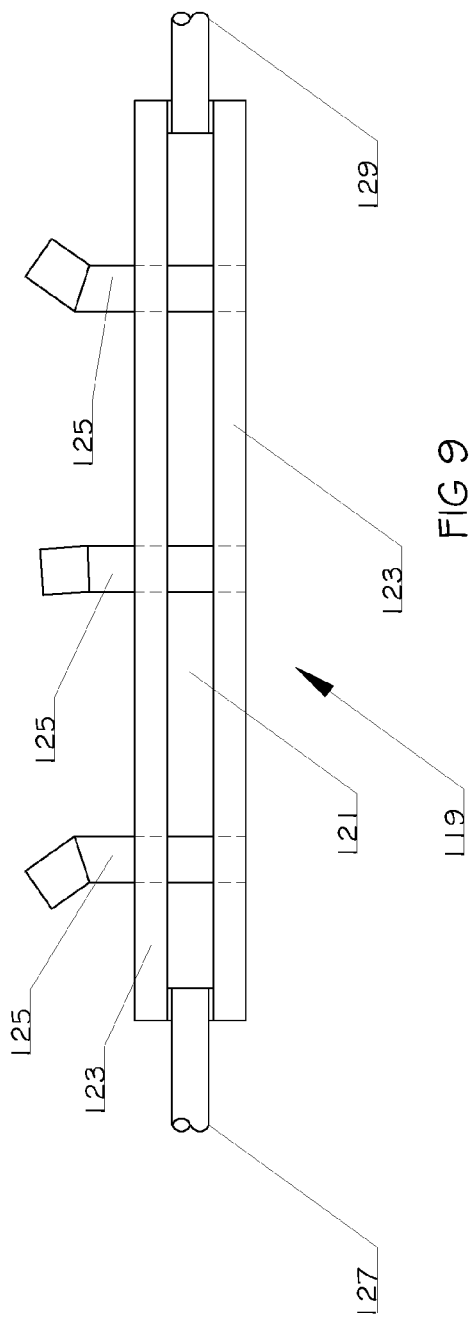
FIG. 9 is a top view of one embodiment of an agitation chamber inlet plate with the top portion joining sub-plates removed.

In some embodiments, it may be advantageous to modify the temperature of the fluid as it is processed. FIG. 8 depicts a system adapted to modify fluid temperature. In one embodiment, the agitation chamber 118 has a temperature modifying agitation chamber inlet plate 119 at its proximal end. The temperature modifying agitation chamber inlet plate 119 is formed by creating a void 121 between adjacent sub-plates 123, as depicted in FIG. 9. FIG. 9 is a top view of the temperature modifying agitation chamber inlet plate 119 with the member joining the sub-plates 123 removed. Tubes 125 provide a fluid flow path through the temperature modifying agitation chamber inlet plate 119. A void 121 is defined by the adjacent surfaces of the sub-plates 123, the exterior walls of tubes 125 and the interior wall of the surface joining the adjacent sub-plates at their periphery. Inlet port 127 and outlet port 129 provide a flow path for heating or cooling fluids through the void 121.

Figure 10:
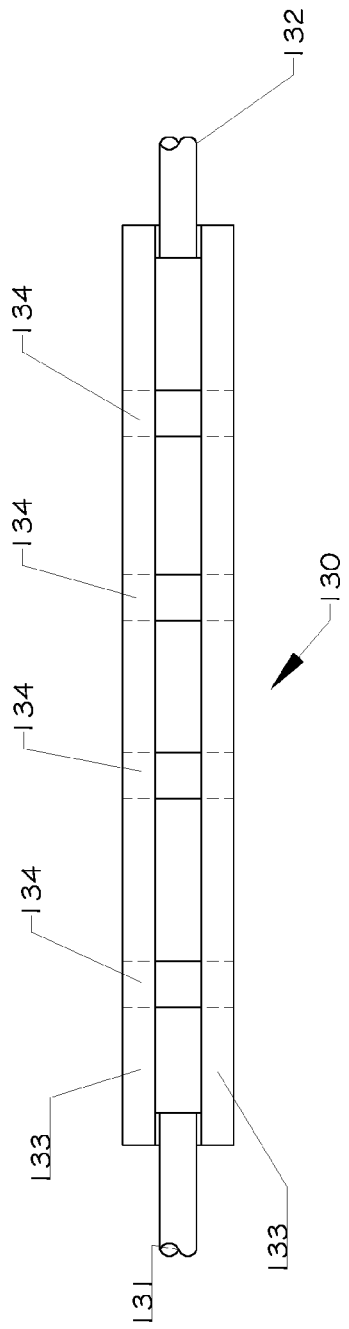
FIG. 10 is a top view of one embodiment of an agitation chamber outlet plate with the top portion joining sub-plates removed.

Temperature modifying agitation chamber outlet plate 130 may be similarly constructed with inlet port 131 and outlet port 132 providing a flow path for heating or cooling fluid between the outlet sub-plates 133 and around outlet tubes 134, as depicted in FIG. 10. FIG. 10 is a top view of the temperature modifying agitation chamber outlet plate 130 with the member joining the sub-plates 133 removed.

Figure 11:
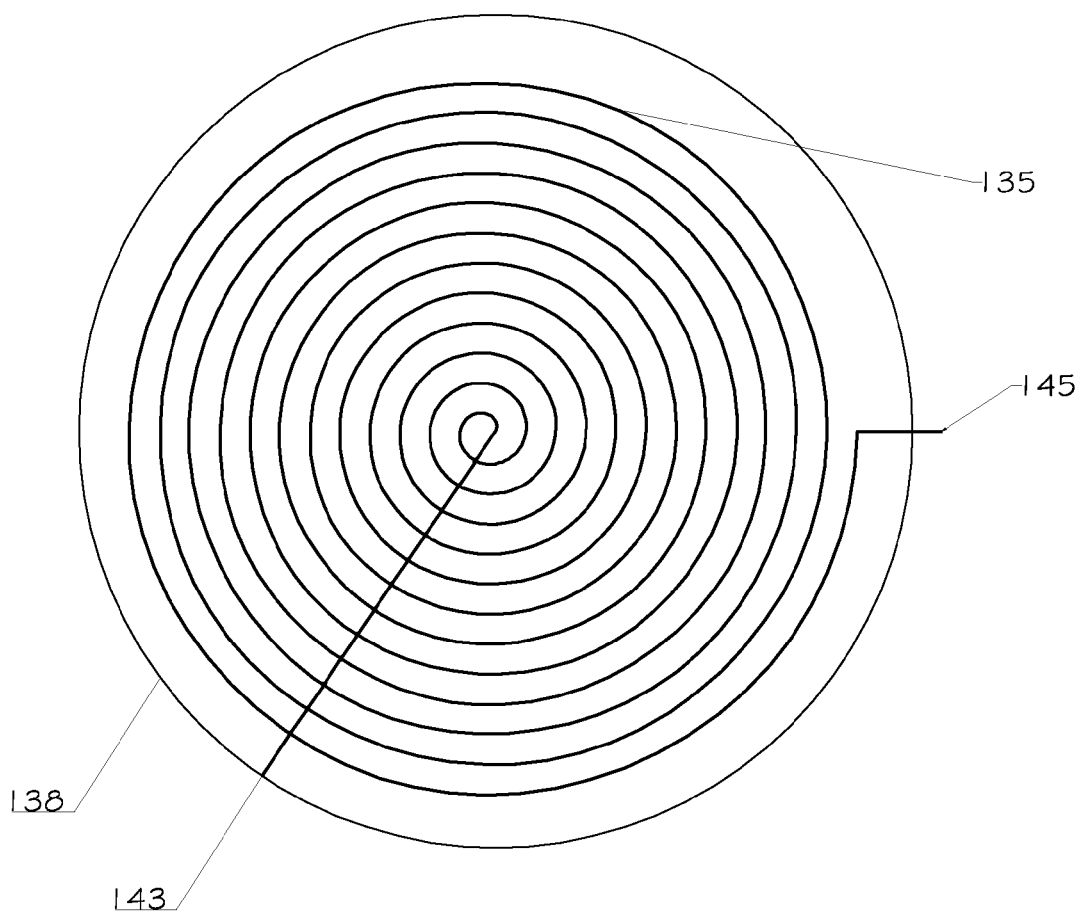
FIG. 11 is a cut away top view of one embodiment of a collection chamber.

Additionally, an optional lower tubing coil 135 may be placed between the bottom of the separation chamber 136 and the first baffle 142. The lower tubing coil 135 is depicted in FIG. 11. The coil may be made of ⅜th inch copper tubing that is spaced such that there is approximately a ⅜th inch gap between adjacent tubing outer walls. The lower tubing coil 135 has an inlet port 143 through the sidewall 138 and an outlet port 145 through the sidewall 138 that provides a flow path for heating or cooling fluids to pass through the lower tubing coil 135. An optional upper tubing coil 147 may be placed between the second baffle 144 and the third baffle 148 as depicted in FIG. 8. The upper tubing coil 147 has an inlet slot 151 and an outlet 153 to provide a flow path for heating or cooling fluids to pass through the upper tubing coil 147.

In embodiments, heating or cooling may be desirable depending upon the nature of the fluid processed. Heating fluids having relatively high viscosity may enhance separation. Conversely, some processed fluids may have a high native temperature detrimental to fluid separation. Cooling such fluids may enhance separation. In some applications, it may be desirable to heat fluid at one stage of the process and to cool the fluid at another stage of the process. It is contemplated that the change in processed fluid temperature will be greater than five degrees Fahrenheit. Described above are methods of modifying the temperature of the processed fluids. The description is not exhaustive and one of ordinary skill will be aware of equivalent methods of modifying the temperature of a fluid being processed.

Figure 12:
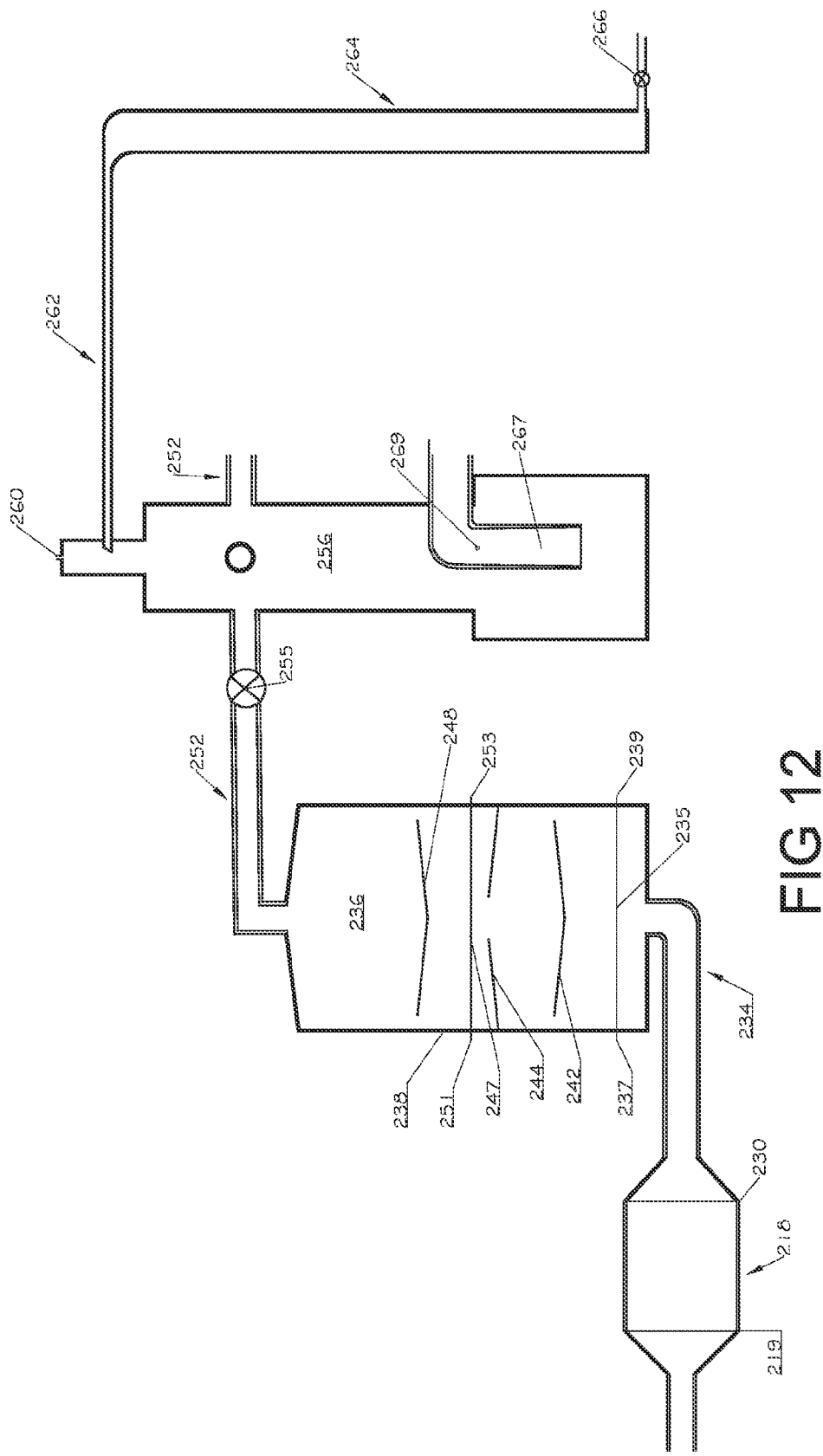
FIG. 12 is a partial cut away side view of one embodiment of a fluid separation system.
Figure 13:
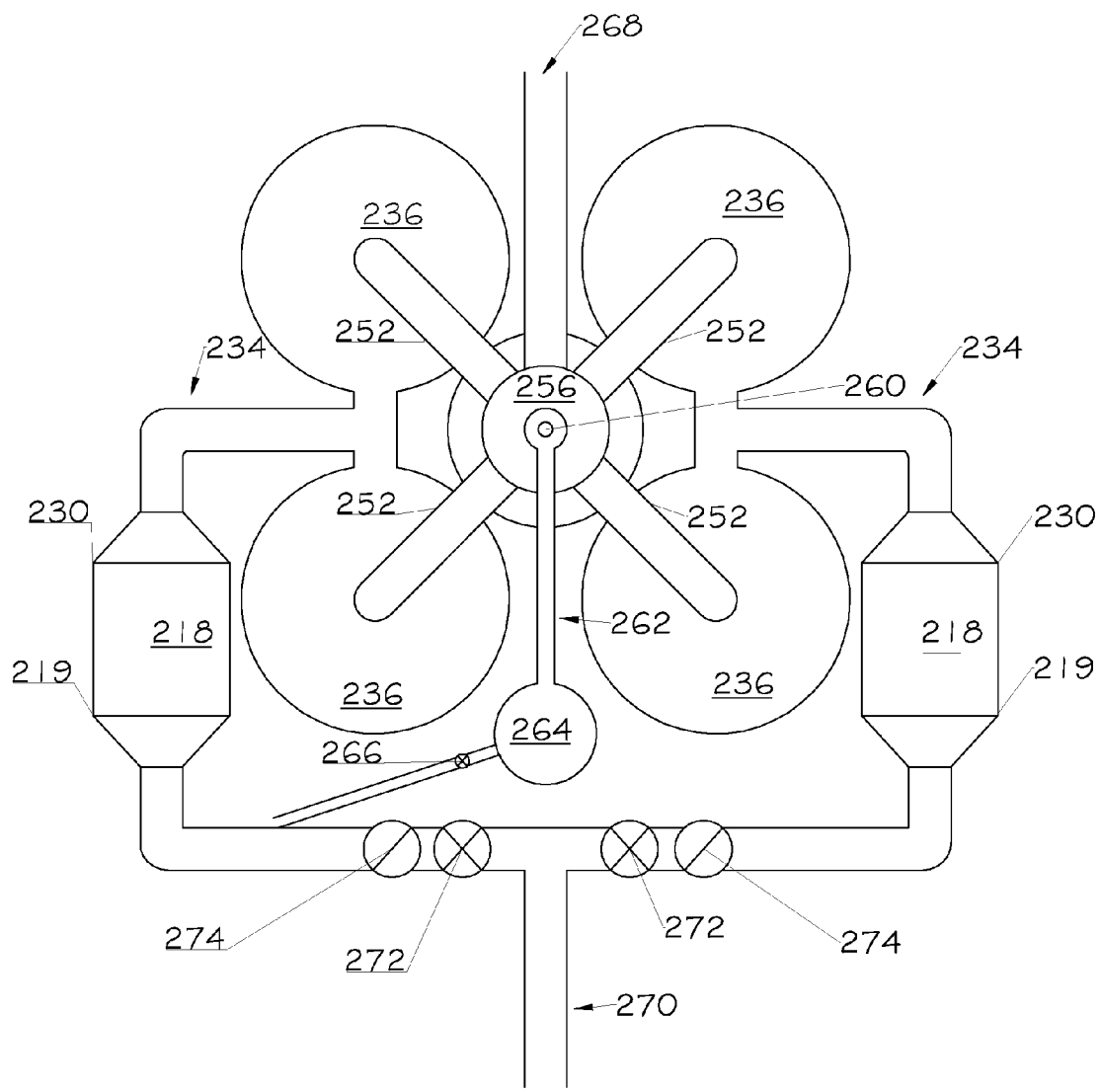
FIG. 13 is a plan view of one embodiment of a separation system having multiple separation chambers and agitation chambers.

FIGS. 12 and 13 depicts an embodiment of a separation system designed to separate fluids such as might be encountered at a crude oil spill or a waste oil stream. FIG. 12 depicts the system laid out in a linear fashion. FIG. 13 is a top view of the system as it might be constructed to maximize space utilization. An optional agitation chamber 218 with an agitation chamber inlet plate 219 and an agitation chamber outlet plate 230 may be provided if it enhances fluid separation. It may be desirable, for example, to pass a fluid through the agitation chamber 218 if the fluid contains a gas component. If fluid separation is enhanced by use of the optional agitation chamber 218, it flows from the agitation chamber 218 through the fluid separation chamber inlet piping 234 into the separation chamber 236. If the agitation chamber 218 is not used, the fluid to be processed may be introduced directly into the separation chamber inlet piping 234.

FIG. 12 depicts a cross-section view of the separation chamber 236. Separation chamber 236 is generally as described above and has an optional lower tubing coil 235 that may be used if fluid temperature modification is desired. The lower tubing coil 235 is placed between the first baffle 242 and the bottom of the separation chamber 236 and has an inlet port 237 through the sidewall 238 and an outlet port 239 that also passes through the sidewall 238. Above the second baffle 244 is optional upper tubing coil 247 and the third baffle 248. The upper tubing coil has an inlet 251 and an outlet 253.

The fluid exists the separation chamber 236 through collection chamber inlet piping 252. A valve 255 is placed in the collection chamber inlet piping 252 to permit isolation of an individual separation chamber 236 from the collection chamber 256. FIG. 12 depicts a single agitation chamber 218 and separation chamber 236 feeding a common collection chamber 256. The collection chamber 256 in FIG. 12 is depicted in cross-section. In the embodiments depicted in FIGS. 12 and 13, it is contemplated that four separation chambers 236 will feed the common collection chamber 256.

If a gas is separated from the processed fluid, it is collected through outlet 260. If fluids having different specific gravities are separated, such as oil and water, the fluid with the lower specific gravity collects in the upper portion of collection chamber 256 and can be collected through outflow line 262 to a storage container 264. When a desired quantity is collected, valve 266 may be opened and the collected fluid removed. It may be advantageous to heat outflow line 262 and/or storage container 264 if the collected fluid is viscous. It is contemplated that in some embodiments the system can separate gas and liquids having different specific gravities from the same fluid mixture.

The fluid with the greater specific gravity naturally collects at the lower portion of collection chamber 256. A siphon tube 267 draws the fluid from the lower portion of the collection chamber 256 and discharges it through outflow pipe 268. The siphon tube 267 has a suction release aperture 269 positioned to break the suction drawing the fluid from the collection chamber 256 if the fluid level in the collection chamber reaches the suction release aperture 269. Such prevents the fluid with the lower specific gravity from being drawn into the siphon tube 267.

It is also contemplated that in some embodiments conventional sensors will be used to regulate the flow of processed fluid into the separation system such that the level of the fluid with the higher specific gravity remains above siphon tube 267 and below outflow line 262.

It is contemplated that embodiments of the inventions disclosed herein may be used in series or in parallel depending on the nature and volume of the fluid being processed and the nature and number of fluids being separated from the processed fluid. FIGS. 12 and 13 depict an embodiment adapted to process a larger quantity of fluid and separating three fluids from the processed fluid, specifically, a gas and two liquids having different specific gravities, more specifically, gaseous hydrocarbons, oil and water.

As depicted in FIG. 13, a main inlet line 270 supplies the fluid being processed to a pair of inlet valves 272. As noted above, inlet valves 272 may be controlled to manage the fluid levels in the collection chamber 256 based upon output from conventional sensors in the collection chamber 256. Check valves 274 are adjacent to the inlet valves 272. The system depicted has a pair of optional agitation chambers 218, as described above. Each agitation chamber 218 supplies fluid to two separation chambers 236, as previously described. Each separation chamber 236 is connected to the collection chamber 256 by collection chamber inlet piping 252.

In the embodiment described, for a flow rate of 250 gpm, it is contemplated that the separation inlet piping 234 has a diameter of 8 inches. The separation chambers 236 have a 60 inch inside diameter. The base of the first baffle 242 is 2 feet, 1 and 13/16th inches from the bottom of the separation chambers 236. The base of the second baffle 244 is one foot, 3 13/16 inches from the base of the first baffle 242. The apex of the third baffle 248 is one foot 7 5/16 inches from the base of the second baffle 244. Each baffle 242, 244, 248 tapers approximately 1.5 to 2 degrees from horizontal as it progresses from base to apex. The separation chambers 236 are eight feet 5 inches tall.

The base of the collection chamber 256 has an outside diameter of 48 inches and the inlet of the siphon tube 266 is one foot 6 inches above the bottom of the collection chamber 256. The collection chamber 256 is 13 feet, 6 and 11/16th inches tall. The bottom of the outflow line 262 is 15 inches below the top of the collection chamber 256. The bottom of the collection chamber inlet piping is nine feet 11/16 inches above the bottom of the collection chamber 256.

One skilled in the art will recognize that the principals of the claimed invention can be practiced in a number of different ways. By way of example, one of ordinary skill will recognize that the number, placement and shape of the baffles and heating elements may by modified to achieve the desired result. Moreover, the configuration of the baffles and the described inlet and outlet plates could be modified and achieve the same purpose. For example, the conical baffles described could be replaced by planar baffles positioned at an angle with apertures at the downstream side of the angled baffle and the downstream side of the angle baffle being upward of the lower portion of the baffle. Similarly, the inlet and outlet plates could be replaced by a series of baffles causing repeated velocity charges.

One skilled in the art will recognize that components may be eliminated without significantly affecting the functionality of the disclosed systems. For example, the strainer and screen could be eliminated and the system would perform substantially the same way.

The invention can be scaled for larger or smaller flows. The agitation chamber and/or separation chamber can be arraigned in parallel or series, or used in the opposite order, depending on the conditions of the fluid mixture to be processed and the requirements of the specific location. In some settings the agitation chamber may be undesirable.

After reviewing the disclosure of the claimed invention, numerous modifications would be apparent to one of ordinary skill in the art to achieve the same result as the claimed invention.

We claim:

1. A method for removing a gas from a fluid, the method comprising:
   introducing the fluid into a first chamber;
   changing a velocity of the fluid by passing the fluid through a plurality of restrictions; and
   collecting, at a collection outlet, at least a portion of the gas that is separated from the fluid as a result of the changing velocity, wherein the at least the portion of the gas is collected for use as a fuel source.

2. The method of claim 1, further comprising discharging at least a portion of the fluid.

3. The method of claim 1, wherein the gas is a volatile gas and wherein the fluid is at least one of: (i) groundwater, (ii) water, (iii) oil, and (iv) a combination thereof.

4. The method of claim 1, wherein the temperature of the fluid is changed more than five degrees Fahrenheit.

5. The method of claim 1, wherein the velocity of the fluid is changed using one or more baffles.

6. The method of claim 5, wherein the baffles are generally horizontal.

7. The method of claim 5, wherein the baffles are conical.

8. A method for separating one or more fluid components from a fluid, the method comprising:
   introducing the fluid into a contained flow path;
   separating at least a first fluid component of the one or more fluid components from the fluid using one or more different flows; and
   collecting, for subsequent use as a fuel source, at least a portion of the at least the first fluid component that was separated from the fluid.

9. The method of claim 8, wherein at least one of the one or more different flows is a laminar flow.

10. The method of claim 8, wherein at least one of the one or more different flows is a turbulent flow and wherein the turbulent flow is caused by passing the fluid through a restriction in the contained flow path.

11. The method of claim 8, wherein the fluid is at least one of: (i) water and (ii) oil, and wherein the at least the first fluid component is a volatile gas.

12. The method of claim 11, wherein the volatile gas is methane.

13. An apparatus for separating one or more volatile gasses from a fluid, the apparatus comprising:
   a velocity changing area configured to cause the fluid to experience a plurality of velocities;
   a flow area configured to cause the fluid to experience one or more types of flow, wherein the one or more types of flow cause at least a portion of the one or more volatile gasses in the fluid to aggregate;
   a chamber for facilitating gravity separation of the one or more volatile gasses from the fluid; and
   a removal orifice configured to collect and store the aggregated one or more volatile gasses.

14. The apparatus of claim 13, wherein flow area contains a plurality of baffles.

15. The apparatus of claim 14, wherein the baffles are conical.

16. The apparatus of claim 13, further comprising a flow path, wherein the flow path is coupled to the velocity changing area and further wherein the flow path is coupled to a pumping component.

17. The apparatus of claim 14, wherein the baffles are substantially horizontal.

18. The apparatus of claim 13, wherein the aggregated one or more volatile gasses are used as a fuel source.

19. The apparatus of claim 13, wherein at least one of the one or more volatile gasses is methane.

20. The method of claim 8, wherein the flows cause a change to a velocity of the fluid.

* * * * *